United States Patent Office 3,491,333
Patented Jan. 20, 1970

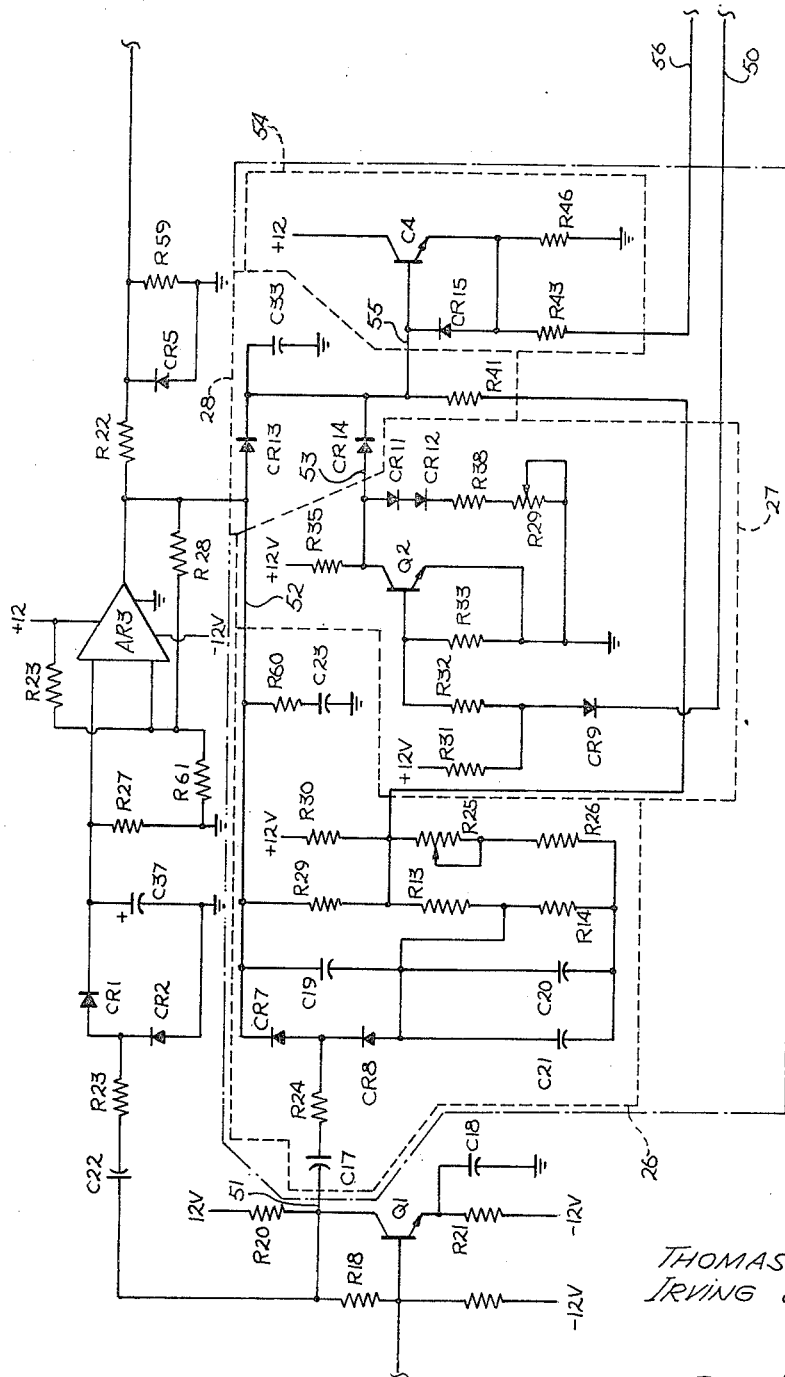

3,491,333
PULSE SONAR NAVIGATIONAL SYSTEM
Thomas A. Goulet, Reseda, and Irving A. Sofen, Granada Hills, Calif., assignors to The Marquardt Corporation, Van Nuys, Calif., a corporation of Delaware
Filed June 14, 1968, Ser. No. 737,123
Int. Cl. G01s 9/66
U.S. Cl. 340—3                                   15 Claims

ABSTRACT OF THE DISCLOSURE

A pulse sonar system is disclosed herein utilizing Doeppler shift information for navigational purposes which employs a controlled oscillator for energizing a projector adapted to transmit acoustical energy into a body of water. The energy is gated by a blanking generator so that a pulse transmission is produced which is returned from the water bottom and sensed by a hydrophone where the return pulse transmission is detected and processed by a tracker to select and reproduce a continuous prodominant frequency in a signal return frequency spectrum of pulse information. The continuous frequency of the tracker is compared to the frequency of the transmitted pulse by means of a demodulator unit in which the difference therebetween constitutes a Doppler frequency that is proportional to velocity which is then employed for navigational purposes.

BACKGROUND OF THE INVENTION

(1) Field of the invention

The present invention relates to Doppler navigational apparatus and more particular to a novel sonar navigational system for determining the velocity of a marine vehicle with respect to the bottom or floor of a body of water, and which employs pulsed acoustical energy to eliminate the adverse effects of cross-talk and volume reverberation.

(2) Description of prior art

Several Doppler navigation systems are currently in use on military and civilian aircraft and marine vehicles. These systems include radar and sonar transmitting and receiving equipment respectively, and detect the Doppler shift of transmitted signals which reflect from the terrain below the craft or vehicle. Other Doppler navigation systems employed for nautical navigation use sonar transmitting and receiving equipment and detect the Doppler shift of sound waves which reflect from the ocean bottom. These principles of operation in both these systems are often the same, and the differences in structure employed are not necessitated by different operating principles, but rather by differences in frequency, propagation velocity, craft velocity, and techniques for detecting and transmitting.

In some prior Doppler navigation systems, a Doppler frequency signal obtained by mixing the transmitted frequency with the received frequency is introduced to analog circuits and therein transformed into motions or shaft displacement representative of the Doppler frequency shift or craft velocity. However, the prior Doppler systems employ a continuous wave sonar Doppler device that accepts all information as a result of the frequency being transmitted. Since the information is at a continuous rate, it is not possible to time discriminate in an effort to separate Doppler frequencies between fixed and moving objects. Although pulse Doppler principles in a general form have been employed in radar devices to detect and monitor relative motion, these devices employ a pulse system for other purposes than employed in the present invention. For example, the purpose of a prior radar pulse system is for the reason that the ratio of peak power to average power can be increased above unity for greater range and less power consumption, and for the reason that the same antenna can be employed for transmission as for reception by time sharing the antenna. Inasmuch as the medium for carrying energy in sonar systems is water, neither of these reasons are applicable for sonar navigational purposes. In addition, cross-talk between the transmitter and receiver is a problem in continuous wave systems, as well as the adverse signal effects derived because of "volume reverberation." By volume reverberation, it is meant that sea water, in contrast to fresh water, contains millions of micro-organisms in a more or less uniform manner throughout temperate and tropic regions of the world. These micro-organisms and the gas bubbles they create cause a back-scattering phenomena to sonar equipment which is known to those skilled in the art as volume reverberation.

Among some of the prior art devices employing continuous wave transmission which suffer from the above difficulties and problems are those represented in the disclosures of U.S. Letters Patent No. 3,231,852; 3,065,463; 2,912,671 and 2,961,190. All of these systems employ a continuous wave transmission technique in which cross-talk is a problem, the necessity of both a transmitter and a receiver, and the inability of the continuous wave transmission system to accurately navigate from volume reverberation signals in a disturbed water environment.

SUMMARY OF THE INVENTION

Accordingly, the problems and difficulties encountered with conventional navigational sonar systems employing continuous wave techniques are obviated by the present invention which provides a pulse sonar system, having an acoustical energy radiating means adapted to generate a pulse transmission under the control of a blanking generator. The radiated energy is back scattered to a receiver means from the ocean floor, as well as from schools of fish, volume reverberation and other sources of extraneous echoes. The blanking generator is coupled to the receiving means for simultaneously gating both the radiating means and the receiving means whereby only the stronger and more desirable reflected signals from the ocean floor is sensed by the receiving means. The selected return signal is introduced to a tracker via a gain control and a demodulator where a comparison is made between the frequency of the return signal and the frequency of the radiated signal to provide a difference or Doppler frequency. The resultant frequency is introduced to a translator and subsequently to a digital adder for ultimate display in terms of vessel velocity, distance or drift in the fore, aft, starboard and port directions.

By Doppler shift, it is meant that a frequency shift is caused by the relative motion between a transmitter or receiver and the back scatter medium such as the ocean bottom. For closing motion, the frequency shift is upward. For opening motion, the frequency shift is downward. The amount of frequency shift is also directly dependent upon the frequency transmitted and the velocity of propagation.

The system of the present invention incorporates a novel tracker functioning in an acquisition scheme which uses less circuitry and less critical circuitry than in conventional trackers. A phase detector and a coherent detector are employed and the acquisition scheme uses logic information from these detectors to control a switch that shorts out the signal to a phase lock loop integrator. This action causes the integrator output to change a voltage controlled oscillator frequency in the direction of the signal frequency so that frequency coincidence and, therefore, "lock" can occur. Changing of the voltage controlled oscillator frequency occurs only when the pulse signal is present. Hence, frequency coincidence and "lock" will always be assured in a reasonable time.

The pulse Doppler sonar navigational system of the present invention further includes a novel gain control which combines a gated manual gain control with time varying gain to suppress the gain during transmission time and shortly afterward. In conjunction with this gain control, peak detection type automatic gain control is employed. This unique combination suppresses the volume reverberation signal and therefore provides more accurate Doppler information involving the desired bottom signal. The pulse signal is only partially suppressed and not totally blanked as in conventional pulsed radar, therefore, the duty factor is a constant. This feature greatly aids the selection of tracker coefficients for optimum performance.

Therefore, it is among the primary objects of the present invention to provide an improved apparatus and equipment incorporating pulsed sonar transmission for navigational purposes in which the relative velocity between two objects may be readily determined.

It is another object of the present invention to provide a pulsed wave sonar Doppler device in which it is possible to time discriminate in such a manner that the Doppler frequency from the bottom of a body of water is the only information employed in the system for determining velocity.

Another object of the present invention is to provide a novel sonar navigational system employing pulsed wave transmission whereby cross-talk is eliminated by enabling the receiver or hydrophone signal to be suppressed during transmission time.

Still a further object of the present invention is to provide a novel pulsed sonar system employing the technique of suppressing the signal return from near the hydrophone so that volume reverberation is eliminated, thereby enabling the signal return from the ocean bottom to be dominant.

Yet a further object of the present invention is to provide a novel pulsed wave sonar system for navigational purposes wherein the ratio of peak power to average power is increased to thereby enable moderate power devices to obtain a useful signal return in deep water.

A further object of the invention is to provide a navigational system employing a pulsed wave transmission of acoustical energy whereby it is possible to navigate from the volume reverberation signal in a deep ocean environment where it is impossible to use Doppler sonar operating from the signal return from the bottom. In order to use the volume reverberation from the undisturbed water for accuracy, the early signal return is blanked or gated out by employment of the pulsed system whereby more accurate information for navigational purposes is derived.

BRIEF DESCRIPTION OF DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is a schematic circuit diagram of the receiver gain control circuitry including the automatic gain control detector, manual gain control and time varying gain circuit incorporated therein; and FIGURE 4 is a schematic diagram of the automatic acquisition portion incorporated into the tracker employed in the system shown in FIGURE 2.

DESCRIPTION OF THE PREFERRED EMBODIMENT

Figure 1:
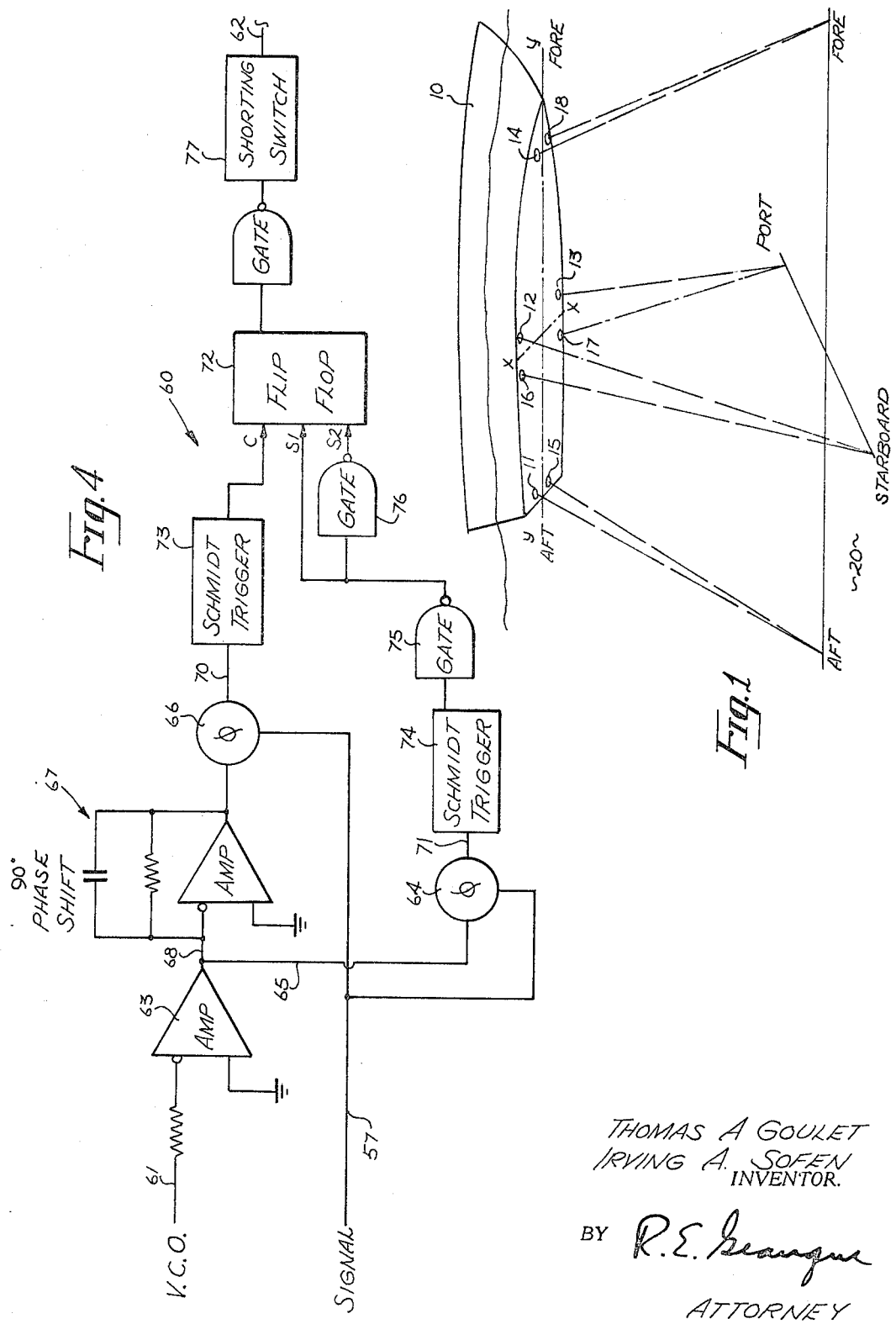
FIGURE 1 is a schematic illustration of the manner in which the acoustical energy radiating transducers and acoustical energy receiving transducers are arrayed in the bottom of a hull in accordance with the present invention.

Referring to FIGURE 1, a marine vehicle 10 is indicated in solid lines having a hull in which the pulsed sonar navigation system of the present invention is installed. For purposes of clarity, the fore-aft axis of the boat will hereinafter be referred to as the Y-axis and the port-starboard as the X-axis, as illustrated. The hull bottom of the craft 10 includes transmitting (projectors) and receiving (hydrophones) transducers in which a set of four highly directional transmitting transducers 11, 12, 13 and 14 are arranged respectively along the X and Y axes in non-critical, fixed spaced apart relationship. Adjacent each of the transmitting transducers there is provided a receiving transducer indicated by the numerals 15, 16, 17 and 18. If desired, the transmitting transducers and the receiving transducers may be arranged in a cluster outwardly extending from the side of the craft 10 from the side of the craft hull. For the present purposes, it is sufficient to note that the transmitting transducers produce narrow beams of ultrasonic energy which are back scattered from an ocean floor 20 to an associated receiving transducer. In an operative embodiment, the beams were radiated at an angle of approximately 60° with respect to the beams of two sets of transducers and with a width of approximately 3°. The parallelism of the transmitted and returning beams is maintained.

Consistent with the present invention is the fact that the floor of the ocean, or any body of water, is never perfectly flat and will therefore radiate the transmitted ultrasonic energy in all directions so that some of the propogated energy will be returned (back scattered) to the receiving transducers. It will become more apparent that the use of two transducers along each axis compensates for the frequency changes which may be caused by roll, pitch or yaw of the boat.

Figure 2:
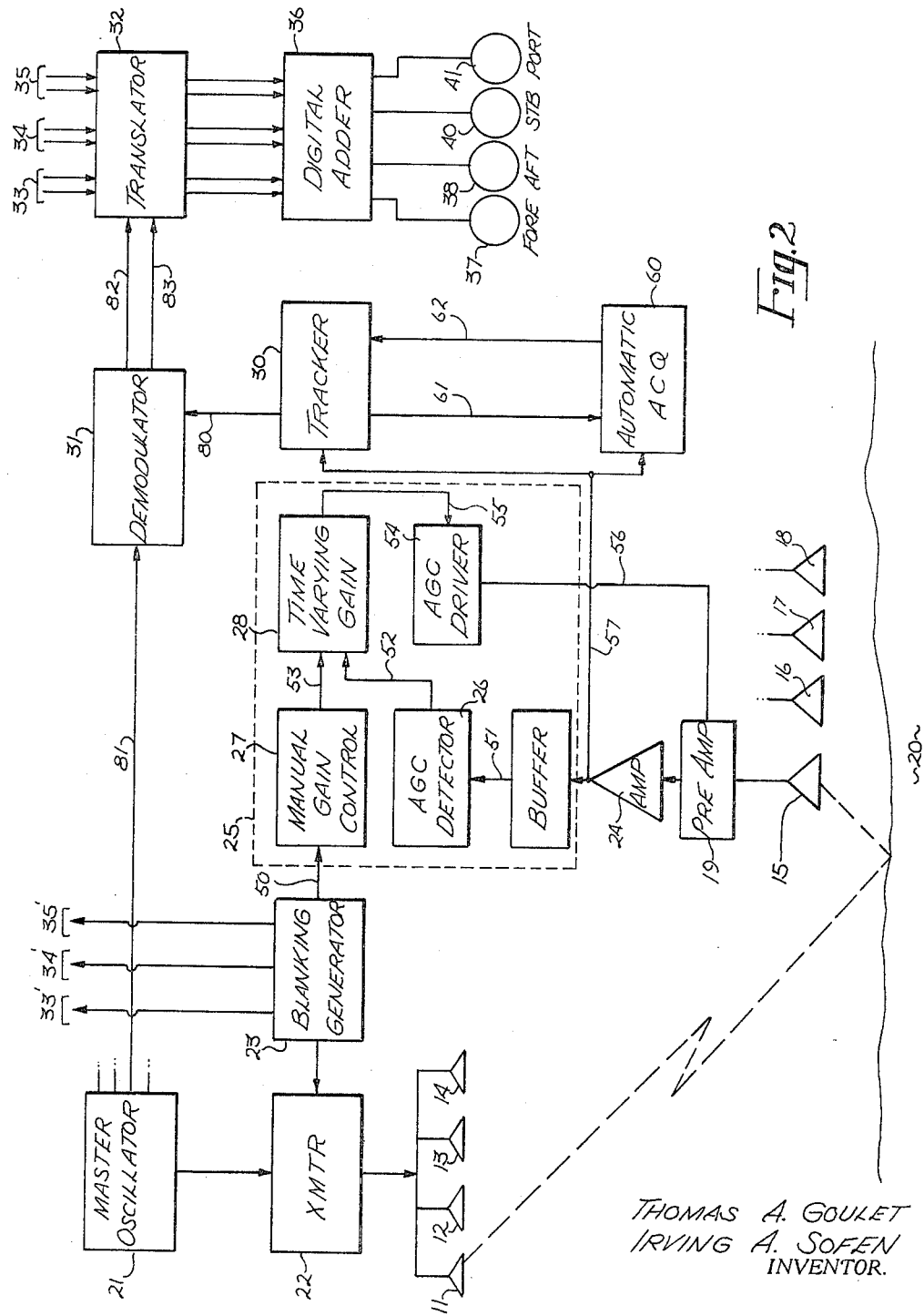
FIGURE 2 is a general block diagram of the electronic system employed in the pulse sonar navigational system of the present invention.

The system for initiating pulsed wave transmission and for deciphering the Doppler information detected by receiving transducers 15–18 inclusive is illustrated in block diagram form in FIGURE 2. The transmitting means of the present system includes an oscillator 21 producing a voltage at an ultrasonic frequency which is coupled to the four transmitting transducers 11, 12, 13 and 14 via a suitable transmitter 22. The radiating transducers take the form of projectors incorporating barium titanate radiators or the like. A blanking signal is provided by a blanking generator 23 which is introduced to the transmitter 22 for alternately turning the transmitter on and off so that the frequency of the signal radiating from the projectors 1–14 inclusive is a pulsed signal train.

The radiated pulse signals impinge on the surface of the ocean floor 20 and are back scattered to a hydrophone receiving means as indicated by numeral 15. However, it is to be understood that although one hydrophone is shown, three other hydrophones may be employed. Additional hydrophones 16, 17 and 18 are employed with additional circuitry such as will be described with respect to hydrophone 15. The acoustical energy received by the hydrophone 15 is applied through a preamplifier 19 and an amplifier 24 to a gain control network 25 that includes an automatic gain control detector 26, a manual gain control 27 and a time varying gain 28.

During the time that the transmitter is transmitting energy into the water via the projectors 11–14 inclusive, the gain of the returned signal through the gain control network 25 is reduced during transmission by the blanking generator 23 which is coupled directly to the manual gain control 27. The AGC circuit included in detector 26 controls the overall gain of the returning back scattered signal being processed by regulating amplification of the pre-amplifier. As the pre-amplifier is driven more positive, the gain of the signal is reduced while when driven more negative, the signal gain is increased proportionately. Manual gain control circuit 27 is selectively effective to reduce signal gain only during the transmit period since the output of the blanking generator is directly coupled thereto. The output of the manual gain control places a positive voltage level on the pre-amplifier 19 to reduce signal gain. A potentiometer in the manual gain control circuit sets the level of gain attenuation. Both the AGC detector circuit and the manual gain control feed into the time varying gain circuit 28. The time varying gain circuit controls the termination of decay during the time that the manual gain control circuit functions by means of an RC network so that normal gain is returned under control of the AGC circuit during return pulse processing (non-blanking). The gain control network 25 is described in detail with reference to FIGURE 3. By this means, the gain control 25 processes an envelope of RF energy which is of the frequency that has been received from the water and which is frequency shifted due to a Doppler effect in the water.

This sample of pulse energy from the amplifier 24 is then made continuous at the same frequency as that occurring in the pulse segment of the received signal which is ultimately applied to a tracker 30.

The pulsed information processed is made continuous by a voltage controlled oscillator in the tracker. The frequency tracker 30 is commonly referred to by those skilled in the art as a phase lock loop which locks upon itself in terms of both frequency and phase. A discrimination circuit in the tracker compares the voltage controlled oscillator output with the incoming signal and produces a difference signal. The difference signal produced is the difference of the comparison in terms of both frequency and phase of the voltage controlled oscillator signal and the incoming signal. The difference signal is then processed by a control circuit which may be referred to as a combination amplifier and integrator.

The signal information introduced to the phase lock loop tracker is pulsed carrier type information and is in the form of a continuous pulse train so that it is in operation only during the time in which the signal is received. Therefore, the voltage controlled oscillator is steered to the phase and frequency which is necessary to attain exact synchronization with the incoming signal. For this purpose, an automatic acquistion circuit 60 is employed as will be described in detail with reference to FIGURE 4. In brief, the acquisition circuit employs logic information from a phase detector and a coherent detector to control a switch that shorts out the signal to the integrator of the tracker. This action causes the integrator output to change the frequency of the voltage controlled oscillator in the direction of the signal frequency so that frequency coincidence and therefore, lock can occur.

The output of the tracker is fed to a demodulator unit 31 which is coupled to the transmitter oscillator 21 so that the original transmitted frequency from the oscillator may be compared with the now continuous frequency received via the hydrophone 15 and tracker so that a frequency difference is derived constituting the Doppler frequency. Frequency shift is caused by the relative movement between the transducers carried on the craft and the ocean floor in an opening and closing manner.

The demodulator unit provides a pair of outputs for processing the positive Doppler signal and the negative Doppler signal. Outputs on either of these lines cannot occur simultaneously but must occur one after another. The outputs of the demodulator are introduced to a translator 32. It is to be noted that in addition to the output shown from demodultaor unit 31, three additional pairs of demodulator unit outputs are shown as indicated by numerals 33, 34 and 35 which are connected to circuitry similar to the hydrophone 15, receiver gain control 25 and tracker unit 30 as well as demodulator 31.

After the signals are applied to the translator, the signals from the various channels of the system occupy sequential time channels and therefore do not occur simultaneously. The signals are then processed so as to then be digitally added in an adder 36 in which the signals are summed from the various outputs of the translator in such a fashion that the equivalent of the pulses represent four velocities by suitable displays 37, 38, 40 and 41 indicative of fore velocity, aft velocity, starboard velocity and port velocity, respectively. Additionally, the vertical or up and down velocity may be displayed.

The overall concept in employing the pulse transmission system of the present invention involves a means of gating the signal reaching the hydrophone to effectively cancel or eliminate the undesired signals. This pulse technique consists of pulsing the transmitter for approximately 70 to 80 milliseconds and reducing the gain of the receiver during this time to discriminate between the desired and undesired signals. The desired signal, which is the signal reflected from the ocean floor, is always the one that appears last because of the travel time of the sound reaching the bottom from the transmitting transducers and to return through the receiving transducer. Because of the transitory period, which is the velocity of sound in water, the signals returning first are the strongest and unwanted signals appearing very close to the base of the receiving transducer. As the pulsed acoustic waves travel to the ocean bottom, the weaker back scattered signals will be delayed proportionally in time from the transmitted pulse. Therefore, by reducing the gain of the receiver during the transmitting time, a reduction in the returning energy during the time it is transmitted permits the favoring of the back scattered weaker signals which are the bottom signals occurring latest in time.

With reference to FIGURE 3, it will be recalled that in the present system, the automatic gain control signal, in order to reduce system gain has to be driven positive and in order to increase the gain, the automatic gain control is made negative. The manual gain control circuit is employed to reduce the gain during the transmit period and with this reduced gain, a more positive signal is derived which is introduced to the automatic gain control circuit via the time varying gain circuit, the AGC driver and the pre-amplifier. The time varying gain circuit, after the period that the gain has been reduced, will slowly drop back to effect normal gain according to a preset time constant.

The incoming blanking signal is introduced to the gain control 25 and is applied directly to the manual gain control circuit 27 on line 50. The signal is applied during the time that it is desired to reduce system gain which is coincident in time with the pulsed transmission. This signal is introduced into the manual gain control circuit via a diode CR9 where it is applied to a transistor Q2 to either connect or disconnect the junction point to Q2 and resistor R35 to ground. When a disconnection occurs, system gain is reduced. This reduction is achieved by adjusting amplitude which is controlled by a potentiometer R39 that is hand adjustable for the system when operated particularly in deep water. During the time when this portion of the gain is not reduced, the polarity applied to transistor Q2 couples the junction of Q2, collector and resistor R35 by means of the transistor to ground so that a diode CR14 is back biased and takes the circuit out of the gain control loop. Diodes CR11 and CR12 are compensating diodes, such that the forward voltage drop of CR11 and CR12 are equal to the voltage drop of CR14 in series with the base-to-emitter voltage of a transistor Q4. Therefore, the circuit tends to track in temperature and adjustment will not be temperature sensitive.

The incoming pulse signal from the hydrophone 15 is introduced to the automatic gain control detector 26 via line 51 which couples the amplifier 24 buffer circuit to the detector. The output of the automatic gain control detector is applied to the time varying gain circuit 28 via line 52 while the output of the manual gain control circuit 27 is introduced to the time varying gain circuit 28 via line 53. The output of the time varying gain circuit 28 is applied to the pre-amplifier 19 by means of an AGC driver circuit 54 coupled to the output of the time varying gain circuit by line 55 and to the pre-amplifier via line 56.

The time varying gain circuit 28 includes an RC network consisting of C33 and R41 for establishing the decay of gain as it slowly drops back to normal gain according to the time constant.

Referring now to FIGURE 4, it is to be recalled that the frequency tracker 30 is commonly referred to as a phase lock loop circuit which includes a voltage controlled oscillator and a VCO control circuit which is a combination of an amplifier and an integrator. Within the tracker, a comparison is made between the voltage controlled oscillator output and the pulsed incoming signal wherein a difference signal is produced which presents a difference not only in frequency but in phase. This latter signal is then processed by the VCO control circuit which steers the voltage controlled oscillator to the phase and frequency that is necessary to attain exact synchronization with the incoming signal frequency from the amplifier 24. It is to be noted that the amplifier 24 is coupled to the tracker 30 by means of line 57 in FIGURE 2. It is to be kept in mind that the reference frequency of the voltage controlled oscillator is a continuous frequency and that the frequency of the incoming signal on line 57 is pulsed information so that the tracker is intended only to be in operation during the time in which the incoming signal frequency is received. For this purpose, an automatic acquisition network 60 is provided which receives the reference frequency from the voltage controlled oscillator via line 61 and which supplies a signal level to the integrator of the tracker via line 62.

In general, the automatic acquisition network includes a discriminator, which is part of the phase lock loop in the tracker, and a shorting switch means interconnected between the VCO control circuit and the discriminator such that when the switch means is shorted, the VCO control circuit will hold and control the voltage controlled oscillator in such a manner that it will not change frequency but will continue to produce the frequency as of the last information received.

Referring now in detail to the automatic acquisition network shown in FIGURE 4, the signal frequency from the voltage controlled oscillator is introduced to an amplifier 63 via line 61. The amplified VCO signal is then applied to a zero phase shift discriminator 64 via branch line 65 and to a 90° phase discriminator 66 after passing through a 90° phase shift network indicated by numeral 67 via line 68. The received signal frequency carried on line 57 is also applied to discriminators 64 and 66 respectively, so that two output phases of the different frequencies between the received signal frequency and the voltage controlled oscillator frequency is derived on lines 70 and 71 respectively. When a null occurs in the zero phase discriminator 64, then a positive level is present on line 71 of the 90° phase discriminator 66. This positive level is applied to a flip flop circuit 72 via a conventional Schmidt trigger 73. This positive voltage level holds the flip flop circuit in a non-operative clear condition. A negative voltage level from the output of the 90° phase discriminator frees the flip flop circuit from its clear condition so that the flip flop circuit may be set by either one of the inputs thereto represented by voltage levels at S1 and S2.

As the zero degree phase discriminator output crosses zero, it inserts a proper pulse into either S1 or S2 inputs to the flip flop circuit so as to set the circuit. The output from the zero phase discriminator 64 is coupled to the flip flop circuit via a Schmidt trigger 74 and inverter gates 75 and 76.

When the 90° phase discriminator applies a negative polarity signal to the clear input of the flip flop multivibrator, the acquisition signal will be prevented from operating when it is not necessary to acquire a signal. When the difference in frequency occurs, the flip flop will be driven from negative to positive. The positive-going signal to the flip flop on the clear input will not cause any action to take place, but will only enable the flip flop to be triggered by either one of the set inputs. The set inputs will flip the flip flop circuit, which results in causing a shorting switch 77 to operate. However, as the zero phase shift discriminator crosses over from positive to negative or negative to positive, the flip flop will change state so that it will cause the shorting of the discriminator. In other words, the flip flop circuit is inoperative when the clear condition has been obtained. When the flip flop circuit is operative, or in its set condition, then the shorting switch is operated to cause no input into the tracker integrator.

It is to be kept in mind that each phase discriminator compares the incoming received signal frequency and phase with the voltage controlled oscillator frequency and phase, resulting in an output difference of frequency and phase. In out-of-lock condition, the acquisition circuit through shorting switch 77 causes ¼ of a cycle of energy to be deleted from the integrator in the tracker. This unbalance of energy causes the voltage controlled oscillator in the tracker to be steered in a proper frequency direction for lock-up.

By means of the tracker and the automatic acquisition network, a continuous voltage controlled oscillator frequency is applied to the demodulator unit 31 via line 80 as shown in FIGURE 2. Inasmuch as this is the same frequency as the received signal frequency, it is employed in the demodulator process to determine Doppler frequency. The now continuous frequency from the tracker via line 80 and the continuous transmission frequency from the transmitter oscillator 21 via a line 81 are compared in the demodulator unit. The oscillator frequency is phase shifted 90° so that both zero degree and 90° phases are used for demodulating purposes. In each of two separate demodulator portions, the oscillator frequency is compared to the voltage controlled oscillator frequency. The outputs of the demodulator unit provide the different frequency in phase of the respective inputs. If the Doppler frequency is positive, indicating a closing rate, the output will occur first on a positive demodulator line 82. If the Doppler frequency is negative, indicating a down or opening rate, the output will occur first on a negative demodulator line 83. Further, cross coupling of NAND gates will inhibit the second output. Therefore, one output line from the demodulator unit will indicate positive Doppler while the other output line will indicate negative Doppler.

The output lines 82 and 83 from the Doppler unit are coupled to the translator 32. It is to be understood that three other pairs of demodulator unit outputs as indicated by numerals 33, 34 and 35 are also coupled to the translator. For clarity purposes, the circuits and networks between the three bracketed lines 33', 34' and 35' from the blanking generator are connected to the corresponding pairs of lines 33, 34 and 35 with the same identical circuitry as previously described with respect to hydrophone 15.

Therefore, it can be seen from the foregoing, that the Doppler Navigational System of the present invention provides unique features in the area of a pulsed Doppler system, back scatter signal attenuation via the receiver gain control 25, and an automatic acquisition network 60 embodied in the phase lock loop of tracker 30. The overall system provides greater accuracy than in conventional navigational systems. The automatic acquisition network artificially supplies a frequency signal by means of the voltage controlled oscillator to supply a frequency signal between the pulsed gaps of the incoming received signal so that a continuous signal at the incoming frequency is produced which may be compared to the transmitting oscillator frequency in the demodulator. By means of the novel receiver gain circuit 25, the incoming signal is suitably attenuated during the transmission portion of the pulsed transmission of energy so that adverse defects of volume reverberation is eliminated.

What is claimed is:

1. In a pulse Doppler navigational system for use in a deep water ocean environment, the combination which comprises:
   a transmitter for generating an electrical continuous frequency signal;
   a blanking generator coupled to said transmitter for interrupting said continuous frequency signal to provide a pulse train;
   radiating means coupled to said transmitter for radiating a pulse accoustical energy corresponding to said pulse train;
   receiver means adapted to sense a back scatter return signal from said pulsed accoustical energy and which includes amplifier means;
   a gain control circuit interconnected between said amplifier means and said blanking generator adapted to attenuate a selected portion of said back scatter return signal under control of said blanking generator;
   a phase lock loop tracker connected to said amplifier means for processing the unattenuated portion of said back scatter return signal;
   an automatic acquistion circuit coupled into the loop of said tracker for establishing a continuous back scatter return signal; and
   a demodulator connected to said transmitter and to said tracker for comparing both continuous signals in frequency so as to determine a difference frequency therebetween employable for navigational purposes.

2. The invention as defined in claim 1 including a translator means coupled to said demodulator for storage and time sequencing.

3. The invention as defined in claim 2 including a digital adder connected to said translator for summing the signal information carried in said translator whereby the analog of the signal information represents the fore velocity, aft velocity, starboard velocity and port velocity respectively.

4. The invention as defined in claim 3 including display means coupled to said adder for indicating the velocity information.

5. The invention as defined in claim 1 wherein said gain control circuit includes an automatic gain control and a manual gain control coupled between said blanking generator and said automatic gain control adapted to selectively reduce the gain of said automatic gain control in response to energization of said blanking generator.

6. The invention as defined in claim 5 including a time varying gain network coupled to said automatic gain control and said manual gain control for terminating the reduction of gain in said automatic gain control by said manual gain control.

7. The invention as defined in claim 1 wherein said demodulator is adapted to alternately produce positive and negative Doppler information.

8. The invention as defined in claim 1 wherein said automatic acquistion circuit includes:
   a 90° phase discriminator and a 0° phase discriminator;
   a shorting switch coupled to said tracker; and
   a flip flop circiut connected between said discriminators and said shorting switch.

9. The invention as defined in claim 8 including a voltage controlled oscillator in said tracker connected to said discriminators and means connecting said back scatter return signal to said discriminators whereby said shorting switch is selectively activated to prevent said back scatter return signal from reaching said tracker.

10. The system as defined in claim 9, wherein said automatic acquisition circuit further includes a pair of discriminator circuits coupled to a shorting switch operable to supply said reference signal as modified in frequency and phase to said tracker means in response to comparison of said reference signals from said voltage control oscillator with said back scatter return signal as applied to said discriminators respectively.

11. A Doppler navigational system comprising:
   pulse generating means;
   means for providing a pulse train of acoustical energy and radiating said acoustical energy into a water medium, said means being responsive to said pulse generating means;
   means for sensing back scattered acoustical energy from said pulse train of acoustical energy;
   means for attenuating a selected portion of the back scattered energy white said radiating means is radiating acoustical energy;
   tracking means coupled to said sensing means and adapted to convert said pulse back scattered energy to a frequency signal, said tracking means comprising a phase loop tracker and a voltage control oscillator for generating a reference signal adapted to be compared with said sensed back scatter return signal and acustic acquisition circuit coupled to said phase lock loop thereof and being adapted to operate only during the intervals between pulses of said back scatter return signals so as to supply said reference signal to said tracker means during said interval; and
   demodulator means coupled between said pulse generating means and said tracker means and being responsive thereto for comparing the frequency of the radiated energy with the frequency of the back scattered energy so as to produce a Doppler frequency.

12. The system as defined in claim 11, wherein said attenuating means includes a gain control circuit coupled between said radiating means and said sensing means and further including a time network for terminating attenuation of said selected portions of back scattered energy.

13. The system as defined in claim 11, and further comprising a blanking generator coupled between said radiating means and said sensing means and adapted to establish initiation of back scatter return signal attenuation simultaneously therewith.

14. A Doppler navigational system comprising:
   means for radiating acoustical energy in a pulse train;
   means for sensing backscatterer acoustical energy from said pulse train;
   means for attenuating a selected portion of the backscatterer energy while said first mentioned means is radiating, said attenuating means including a gain control circuit coupled between said radiating and said sensing means and which further includes a time network for terminating attenuations of said selected portion of said backscatterer energy;
   a tracking means connected to said sensing means adapted to convert said pulsed backscatterer energy to a continuous frequency signal, said tracking means comprising a phase loop lock tracker and further includes a voltage controlled oscillator for generating a reference signal adapted to be compared with said sensed backscatterer return signals; and
   demodulator means coupled between said first mentioned means and said tracking means for comparing the frequency of the radiated energy with the frequency of the backscatterer energy so as to produce a Doppler frequency.

15. The system as defined in claim 14 and further including a blanking generator coupled between said radiating means and said sensing means and being adapted to establish said pulse train and to establish initiation of backscatterer return signal attenuation simultaneously therewith.

References Cited

UNITED STATES PATENTS

| | | | |
|---|---|---|---|
| 3,009,143 | 11/1961 | Clarke | 343—8 |
| 3,028,578 | 4/1962 | Stanton | 340—1 |
| 3,217,323 | 11/1965 | Fackler et al. | 343—8 X |
| 3,223,965 | 12/1965 | Beebe | 340—3 |
| 3,234,548 | 2/1966 | Colby | 343—8 X |
| 3,257,638 | 6/1966 | Kritz et al. | 340—3 |
| 3,295,127 | 12/1966 | Kross | 343—7 |

RICHARD A. FARLEY, Primary Examiner

U.S. Cl. X.R.

343—7, 8